(12) United States Patent
Archer et al.

(10) Patent No.: US 8,896,448 B2
(45) Date of Patent: Nov. 25, 2014

(54) METHOD AND APPARATUS FOR MAPPING RADIO FREQUENCY IDENTIFICATION (RFID) TAGS TO NETWORK ADDRESSES

(75) Inventors: Steven T. Archer, Dallas, TX (US);
Francisco A. Dias, Corinth, TX (US);
Kristopher A. Pate, Sachse, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 321 days.

(21) Appl. No.: 11/564,508

(22) Filed: Nov. 29, 2006

(65) Prior Publication Data
US 2008/0122621 A1    May 29, 2008

(51) Int. Cl.
G08B 13/14    (2006.01)
G06Q 10/08    (2012.01)

(52) U.S. Cl.
CPC ................................ *G06Q 10/08* (2013.01)
USPC .............. 340/572.1; 340/539.13; 340/539.26; 340/539.27; 340/10.1; 340/5.92; 235/375; 235/385; 235/435

(58) Field of Classification Search
CPC ............ G06K 7/0008; G06K 19/0723; G06K 19/07749; G06Q 10/08; G06Q 10/087
USPC .......... 340/572.1, 539.13, 539.26, 10.1, 5.92, 340/539.27; 382/195; 235/385, 435, 375; 370/392; 705/36
See application file for complete search history.

(56) References Cited

U.S. PATENT DOCUMENTS

| | | | |
|---|---|---|---|
| 2003/0222762 A1* | 12/2003 | Beigl et al. | 340/5.92 |
| 2004/0145472 A1* | 7/2004 | Schmidtberg et al. | 340/539.27 |
| 2005/0199716 A1 | 9/2005 | Shafer et al. | |
| 2005/0209947 A1* | 9/2005 | Shafer | 705/36 |
| 2005/0219120 A1* | 10/2005 | Chang | 342/357.13 |
| 2005/0252957 A1 | 11/2005 | Howarth et al. | |
| 2005/0253718 A1* | 11/2005 | Droms et al. | 340/572.1 |
| 2006/0022800 A1* | 2/2006 | Krishna et al. | 340/10.2 |
| 2006/0022801 A1* | 2/2006 | Husak et al. | 340/10.5 |
| 2006/0022815 A1* | 2/2006 | Fischer et al. | 340/505 |
| 2006/0034282 A1* | 2/2006 | Hattig | 370/392 |
| 2006/0066444 A1 | 3/2006 | Steeves et al. | |

\* cited by examiner

*Primary Examiner* — Vernal Brown
*Assistant Examiner* — Sisay Yacob

(57) ABSTRACT

An approach is provided for mapping a radio frequency identification (RFID) tag to a network routable address.

18 Claims, 5 Drawing Sheets

METHOD AND APPARATUS FOR MAPPING RADIO FREQUENCY IDENTIFICATION (RFID) TAGS TO NETWORK ADDRESSES

BACKGROUND INFORMATION

Radio frequency identification (RFID) devices have emerged as an attractive approach for a variety of tracking applications. These devices, also referred to as "tags" or "labels," are typically affixed to objects for identifying and tracking of such objects. A RFID tag is scanned or "interrogated" using radio frequency electromagnetic waves, which permit non-line of sight communication with a RFID reader. RFID tags include circuitry that can be either active or passive. When a passive RFID tag is within range of the RFID reader, the antenna of the tag receives energy from the broadcast signals of the reader. However, the transmissions are confined to a relatively short range within a physical facility or localized site. Consequently, RFID applications have been developed for site specific usage, with little or no capability to coordinate across multiple sites.

Therefore, there is a need for an approach that permits greater application of RFID technology, without the constraint of distance.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

An apparatus, method, and software for mapping radio frequency identification (RFID) tags to network routable addresses are described. In the following description, for the purposes of explanation, numerous specific details are set forth in order to provide a thorough understanding of the various exemplary embodiments. It is apparent, however, to one skilled in the art that the various exemplary embodiments may be practiced without these specific details or with an equivalent arrangement. In other instances, well-known structures and devices are shown in block diagram form in order to avoid unnecessarily obscuring the exemplary embodiments.

Figure 1:
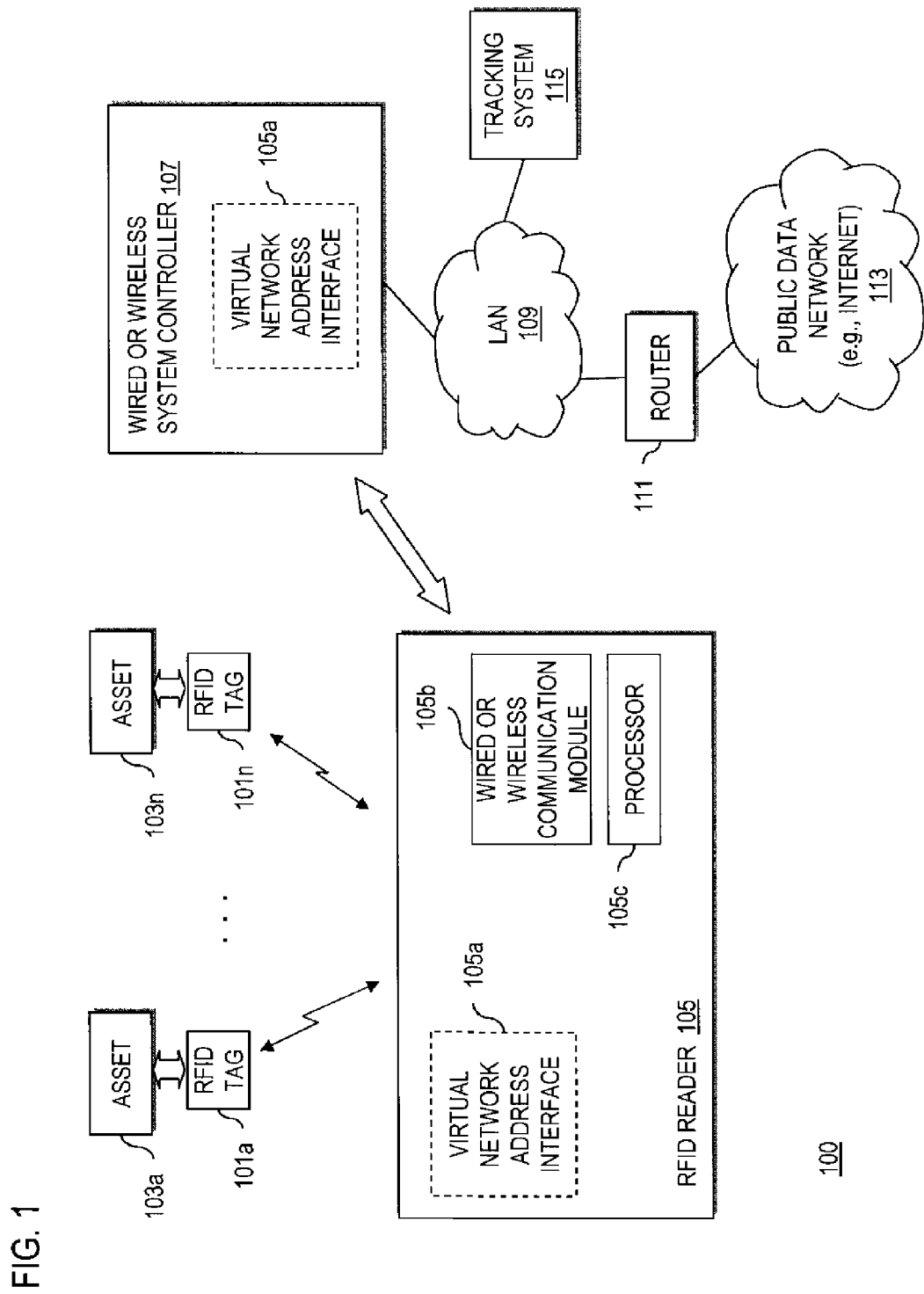
FIG. 1 is a diagram of a tracking system capable of communicating with radio frequency identification (RFID) tags using network addresses, according with an exemplary embodiment.

FIG. 1 is a diagram of a tracking system capable of communicating with radio frequency identification (RFID) tags using network addresses, according with an exemplary embodiment. A RFID system 100 provides for tracking of assets or objects using RFID tags (or transponders) 101 that are affixed to the assets 103. A RFID reader 105 detects different RFID tags 101 and captures the associated RFID signals. As shown, the RFID reader 105 includes a virtual network address interface 105a that maps network routable addresses, such as an Internet Protocol (IP) address, to the particular RFID tags 101; the virtual network address interface 105a can also be deployed within other components or network devices. Through the address mapping, the RFID tags 101 are given network presence. This mapping process is further detailed below with respect to FIGS. 2-4. Although certain embodiments are explained in the context of an IPv6 addressing scheme, it is contemplated that other network routable address schemes can be utilized.

Each RFID tag 101 includes a microchip and a coiled antenna for storing and transmitting data about the asset 103. The RFID tags 101 can be active or passive, and need not be within line-of-sight with the RFID reader 105. Active tags include electronics that require power to transmit data to the RFID reader 105, and thus, are generally more costly than passive tags. Passive tags utilize the magnetic field generated between the tags and the RFID reader 105 as power to modulate and reflect RF signals emitted by the reader 105. Additionally, the RFID tags 101 can be read-only, volatile read/write, or write one/read many. The particular type of RFID tags 101 depend on the particular application and other factors, such as cost.

Operationally, the RFID reader 105 tunes to the same frequency as the tags 101. The system 100 can be configured to operate in a variety of frequencies from low to ultra-high frequency (UHF) or even microwave, depending on the separation between the RFID tags 101 and the RFID reader 105. For example, UHF frequencies can support applications distances of up to about 20 feet. The system 100 can operate in the frequency ranges of about 50 kHz to about 2.5 Ghz.

The output of the RFID reader 105 is then transmitted via a wired or wireless communication module 105b using, correspondingly, various wire line protocols or wireless protocols (over various frequency ranges) to a system controller 107. A processor 105c can also be included within the RFID reader 105 to execute other instructions or functions of the reader 105. The wireless system controller 107 can optionally be configured to provide the virtual network address interface 105a. The controller 107 interfaces with a local area network (LAN) 109. The LAN 109 provides connectivity to a public data network 113, such as the global Internet, via a router 111.

In this exemplary system 100, a tracking system 115 provides for communication with the RFID tags 101 using network addresses that are recognizable by the router 111.

Figure 2:
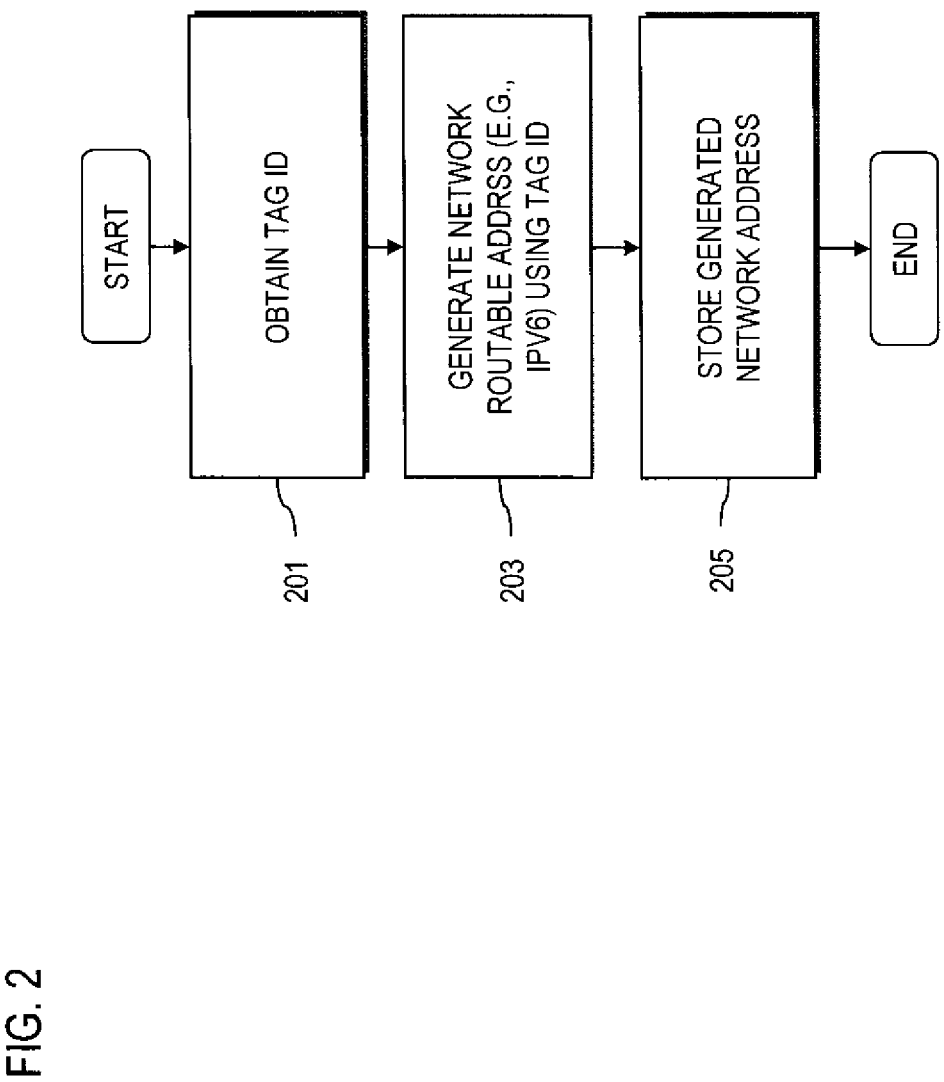
FIG. 2 is a flowchart of a process for mapping RFID tags to network addresses, according to an exemplary embodiment.

FIG. 2 is a flowchart of a process for mapping RFID tags to network addresses, according to an exemplary embodiment. In step 201, the RFID tag ID is determined. A network routable address, as in step 203, is next generated. The generated network address is then stored, per step 205. Thereafter, routing devices or nodes, e.g., router 111, can be populated with this address.

Figure 3:
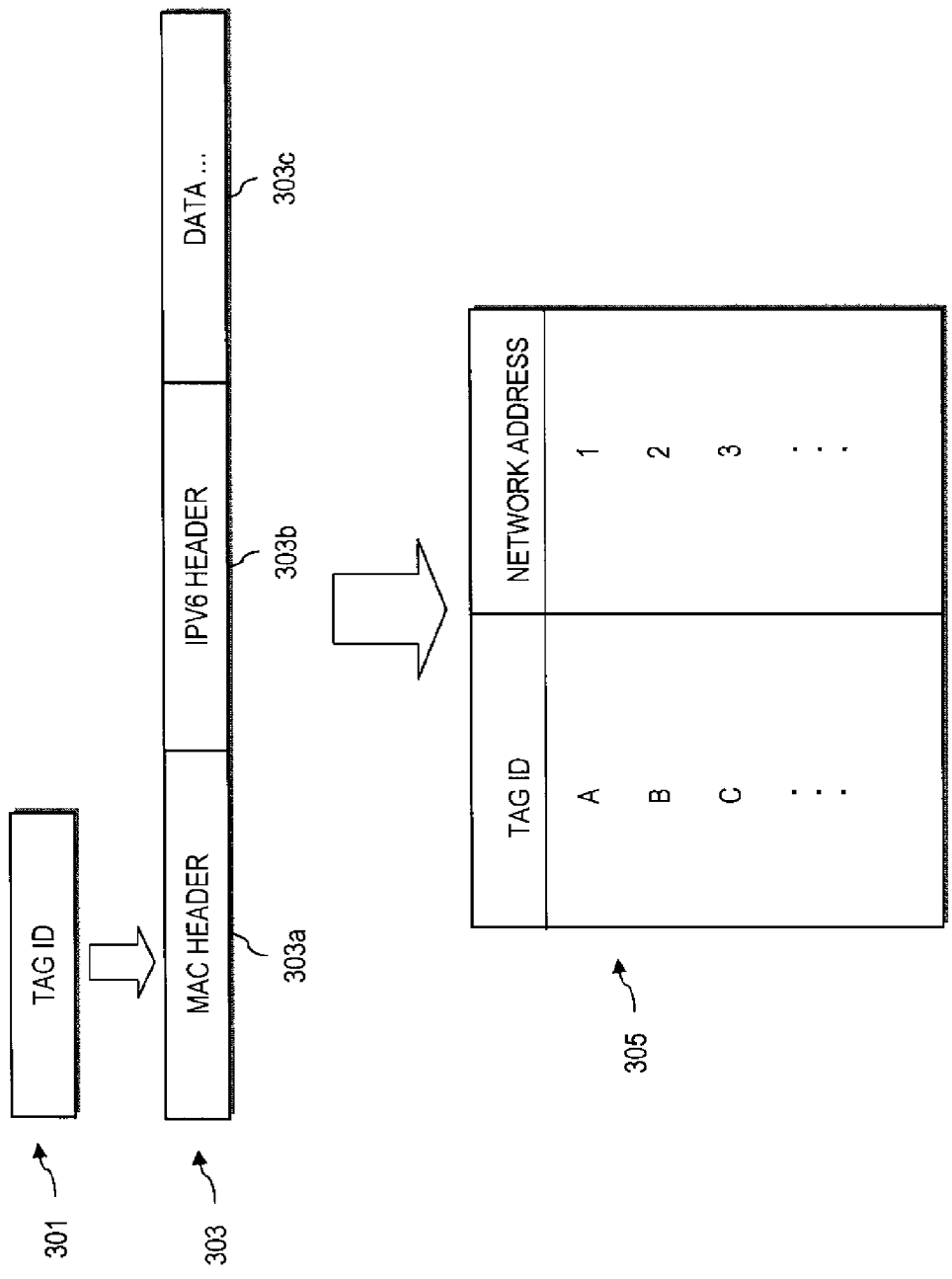
FIG. 3 is a diagram of an exemplary format of a network address derived from a RFID tag, according to an exemplary embodiment.

FIG. 3 is a diagram of an exemplary format of a network address derived from a RFID tag according to an exemplary embodiment. In this example, a tag ID 301 is used to derive an IPv6 address. The network address 303 includes a Medium Access Control (MAC) header 303a, an IPv6 header 303b, and a data payload 303c. The tag ID 301, as a unique identifier, can serve as the MAC header.

The IPv6 header 303b includes various fields, as enumerated in Table 1:

TABLE 1

| FIELD | LENGTH | DESCRIPTION |
| --- | --- | --- |
| Version | 4 bits | IPv6 version number |
| Traffic Class | 8 bits | Internet traffic priority delivery value |
| Flow Label | 20 bits | Used for specifying special router handling from source to destination(s) for a sequence of packets. |
| Payload Length | 16 bits unsigned | Specifies the length of the data in the packet. When cleared to zero, the option is a hop-by-hop Jumbo payload. |
| Next Header | 8 bits | Specifies the next encapsulated protocol. The values are compatible with those specified for the IPv4 protocol field. |
| Hop Limit | 8 bits unsigned | For each router that forwards the packet, the hop limit is decremented by 1. When the hop limit field reaches zero, the packet is discarded. This replaces the Time-to-Live (TTL) field in the IPv4 header that was originally intended to be used as a time based hop limit. |
| Source address | 16 bytes | The IPv6 address of the sending node. |
| Destination address | 16 bytes | The IPv6 address of the destination node. |

IPv6 is further detailed in Internet Engineering Task Force (IETF) Request for Comment (RFC) 2460, which is incorporated herein by reference in its entirety.

As shown, the resultant address 303 can be stored as a table 305. The table 305 provides mapping of tag IDs A, B, C, etc. to the network addresses, 1, 2, 3, etc., respectively. This table 305 is used by the virtual address network 105a (of FIG. 1). The above addressing scheme is exemplary in nature, as other network addressing schemes can be utilized—e.g., Open System Interconnection (OSI) network layer addressing.

Figure 4:
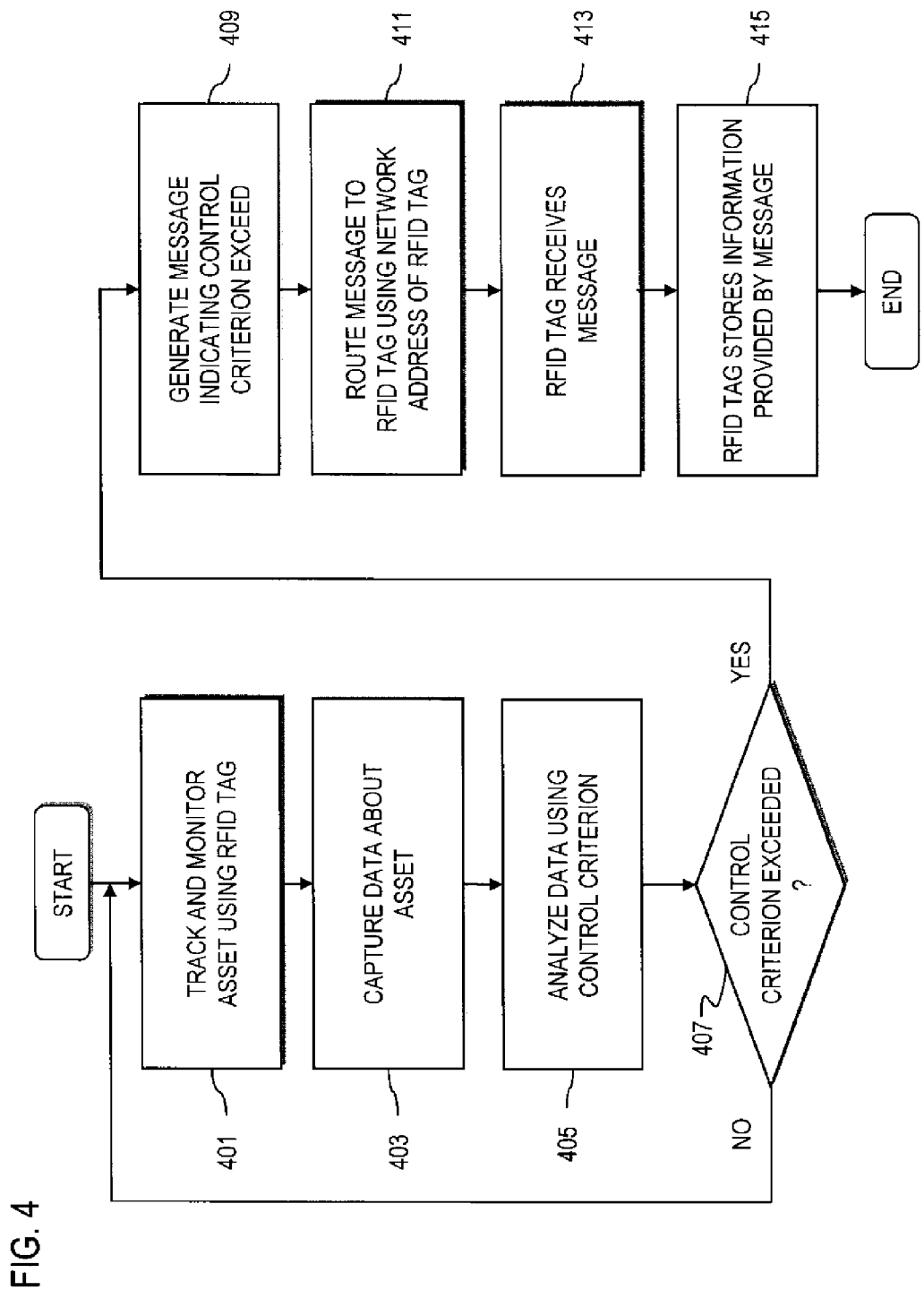
FIG. 4 is a flowchart of a process for communicating with RFID tags over the data network of FIG. 1, according to various exemplary embodiments.

FIG. 4 is a flowchart of a process for communicating with RFID tags over the data network of FIG. 1, according to various exemplary embodiments. By way of example, the process of tracking assets is explained with respect to the tracking system 115 of FIG. 1. The assets 103 are monitored and tracked, as in step 401, by the tracking system 115. In step 403, data about an asset (e.g., asset 103a) is captured, and the data is analyzed by the tracking system 115 using, in an exemplary embodiment, a control criteria (step 405). For example, the control criteria can specify environmental conditions that are to be monitored about the asset 103a; the asset 103a can be a perishable good that requires strict environmental controls. Under this scenario, the RFID tag 101a corresponding to the asset 103a can include a thermal sensor to register the temperature of the storage area. This information can be transmitted to the RFID reader 105 and provided to the tracking system 115.

The tracking system 115 can then apply the control criterion, for instance, that the temperature should not exceed a certain temperature otherwise the good can be compromised (e.g., spoiled, stale, melted, etc.). If the criterion is exceeded, as determined in step 407, the tracking system 115 generates a message indicating the critical temperature has been exceeded (step 409). The message can be captured in an IPv6 message that is routed, per step 411, to the RFID tag 101a, using a network address corresponding to the tag 101a over the Internet 113 to reach the local area network 109. At this point, the message is processed by the wireless system controller 107 and sent to the RFID reader 105. Upon receipt of the message (step 413), the RFID reader 105 determines the proper RFID tag by mapping the network address of the message to the tag ID using the virtual network address interface 105a.

Thereafter, the RFID reader 105 broadcasts the information contained within the message to RFID tag 101a. In step 415, the RFID tag 101a stores the information, which specifies that the asset 103a has been stored in an area that has experienced a temperature point exceeding a predetermined criterion. With this information captured on the tag 101a, the history of the asset 103a can be maintained and utilized appropriately to determine how the asset 103a is to be handled (e.g., discarded, etc.).

In addition to the above process for inventory control, the tracking system 105 can be deployed in a variety of other applications.

The above described processes relating to network addressing may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof Such exemplary hardware for performing the described functions is detailed below.

Figure 5:
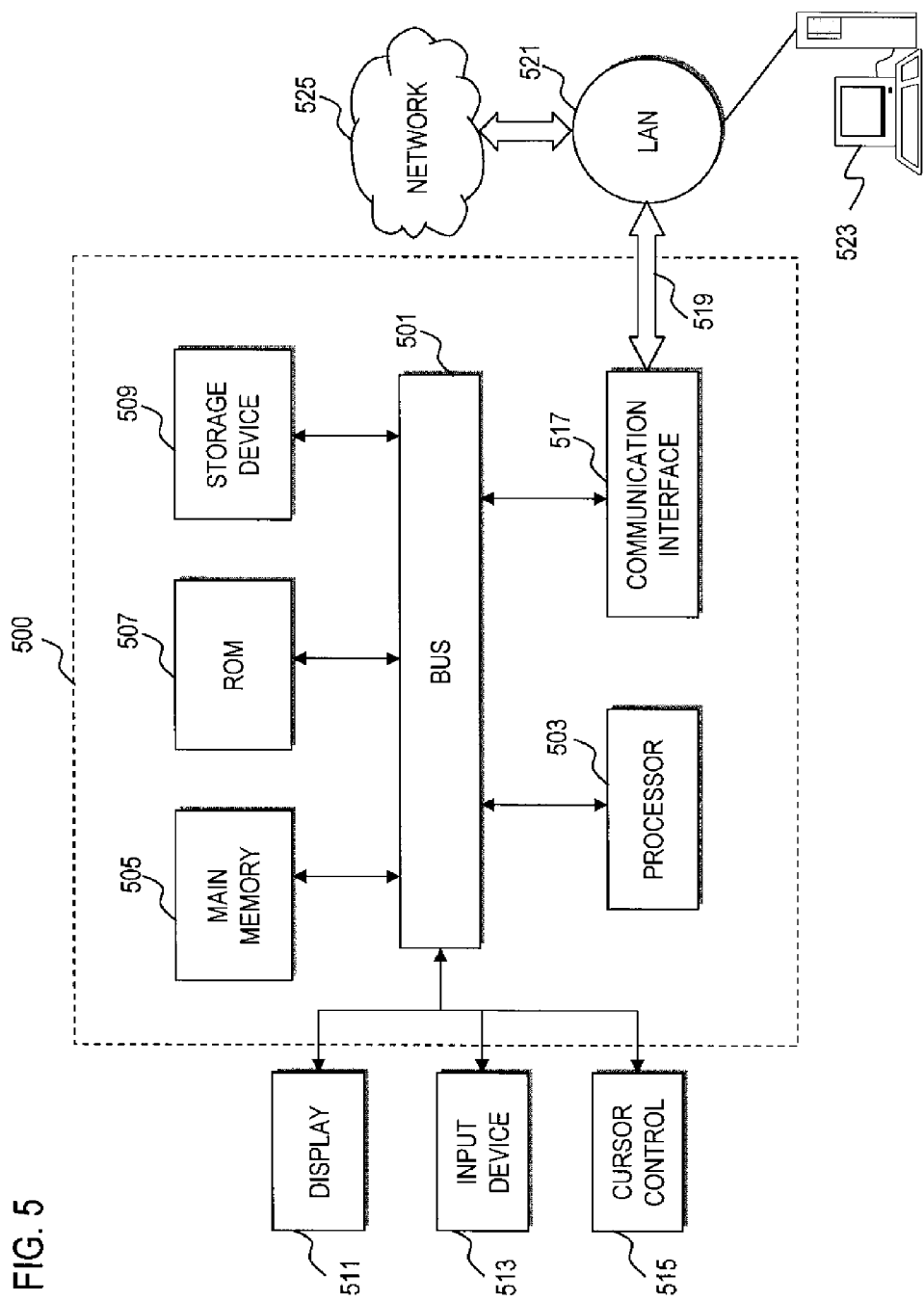
FIG. 5 is a diagram of a computer system that can be used to implement various exemplary embodiments.

FIG. 5 illustrates a computer system 500 upon which an exemplary embodiment can be implemented. For example, the processes described herein can be implemented using the computer system 500. The computer system 500 includes a bus 501 or other communication mechanism for communicating information and a processor 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for controlling cursor movement on the display 511.

According to one embodiment of the invention, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the exemplary embodiment. Thus, exemplary embodiments are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIG. 5, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an exemplary embodiment through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to non-volatile media, volatile media, and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the various exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that flow. The specification and the drawings are accordingly to be regarded in an illustrative rather than restrictive sense.

The following patent application is incorporated herein by reference in its entirety: co-pending U.S. patent application Ser. No. 11/564,535 filed Nov. 27, 2006, entitled "Method and Apparatus for Managing Radio Frequency Identification (RFID) Tags."

What is claimed is:

1. A method comprising:
    obtaining a tag identifier of a radio frequency identification (RFID) transponder that is unique to the RFID transponder;
    generating a network routable address by using the tag identifier as part of the network routable address;
    mapping the network routable address to the RFID transponder, wherein the network routable address is used to communicate with the RFID transponder over a data network, and wherein the communication with the RFID transponder includes historical data related to control criterion of an asset coupled to the RFID transponder that is received and stored by the RFID transponder;
    determining, by a tracking system, whether the control criterion of the asset is exceeded;
    generating, by the tracking system, a message indicating the control criterion of the asset is exceeded, wherein the tracking the system is remote from the RFID transponder; and
    routing the message to the RFID transponder using the network routable address.

2. A method according to claim 1, wherein the network routable address is an Internet Protocol (IP) address and configurable to be stored as a table.

3. A method according to claim 2, wherein the IP address includes an IPv6 address, and wherein the tag identifier is used as a Medium Access Control (MAC) header in the network routable address.

4. A method according to claim 1, further comprising:
    tracking the asset coupled to the RFID device over the data network using the network routable address.

5. A method according to claim 1, further comprising:
transmitting data about the asset to the RFID device over the data network using the network routable address, wherein the data includes the generated message; and
determining, by a RFID reader, the RFID transponder as the proper RFID transponder by mapping the network routable address to the tag identifier using a virtual network address interface.

6. A method according to claim 1, wherein the historical data relates to environmental conditions about the asset and monitored by a sensor of the RFID transponder.

7. A method according to claim 1, wherein the network routable address is an Internet Protocol (IP) address and includes a Medium Access Control (MAC) header, an IPv6 header, and data payload.

8. An apparatus comprising:
a processor configured to obtain a tag identifier of a radio frequency identification (RFID) transponder that is unique to the RFID transponder, to generate a network routable address by using the tag identifier as part of the network routable address, to map the network routable address to the RFID transponder, to determine whether a control criterion of an asset coupled to the RFID transponder is exceeded, and to generate a message indicating the control criterion of the asset is exceeded,
wherein the apparatus is remote from the RFID transponder, the network routable address is used to communicate with the RFID transponder over a data network, the communication with the RFID transponder includes historical data related to the control criterion of the asset coupled to the RFID transponder that is received and stored by the RFID transponder, and the message is routed to the RFID transponder using the network routable address.

9. An apparatus according to claim 8, wherein the network routable address is an Internet Protocol (IP) address.

10. An apparatus according to claim 9, wherein the IP address includes an IPv6 address, and wherein the tag identifier is used as a Medium Access Control (MAC) header in the network routable address.

11. An apparatus according to claim 8, wherein the asset is coupled to the RFID device and tracked over the data network using the network routable address.

12. An apparatus according to claim 8, further comprising:
a communication interface configured to transmit data about the asset to the RFID device over the data network using the network routable address, wherein the data includes the generated message.

13. A method comprising:
tracking, by a processor, an asset using a radio frequency identification (RFID) transponder;
determining whether a control criterion of the asset is exceeded; and
generating, by the processor, a message including data for storage in the asset; and
routing the message over a data network to the RFID transponder using a network routable address generated by using a tag identifier obtained from the RFID transponder, which is unique to the RFID transponder, as part of the network routable address,
wherein processor is remote from the RFID transponder, the message includes historical data related to the control criterion of the asset coupled to the RFID transponder that is received and stored by the RFID transponder, and the historical data specifies that the control criterion of the asset has been exceeded.

14. A method according to claim 13, further comprising:
determining, by a RFID reader, the RFID transponder as the proper RFID transponder, by mapping the network routable address message to the tag identifier using a virtual network address interface,
wherein the network routable address is an Internet Protocol (IP) address.

15. A method according to claim 14, wherein the IP address includes an IPv6 address derived from the tag identifier, and wherein the tag identifier is used as a Medium Access Control (MAC) header in the network routable address.

16. A system comprising:
a processor configured to track an asset using a radio frequency identification (RFID) transponder, to determine whether a control criterion of the asset is exceeded, and to generate a message including data for storage in the asset; and
a communication interface configured to forward the message over a data network to the RFID transponder using a network routable address generated by using a tag identifier obtained from the RFID transponder, which is unique to the RFID transponder, as part of the network routable address,
wherein the processor is remote from the RFID transponder the message includes historical data related to control criterion of the asset coupled to the RFID transponder that is received and stored by the RFID transponder, the historical data specifies that the control criterion of the asset has been exceeded, and a RFID reader determines the RFID transponder as the proper RFID transponder, by mapping the network routable address to the tag identifier.

17. A system according to claim 16, wherein the network routable address is an Internet Protocol (IP) address.

18. A system according to claim 17, wherein the IP address includes an IPv6 address derived from the tag identifier, and wherein the tag identifier is used as a Medium Access Control (MAC) header in the network routable address.

* * * * *